US008259187B2

(12) United States Patent  (10) Patent No.: US 8,259,187 B2
Liu  (45) Date of Patent: Sep. 4, 2012

(54) METHOD AND SYSTEM FOR COMBINING IMAGES IN CAMERA DEVICE

(75) Inventor: Jun Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 407 days.

(21) Appl. No.: 12/629,616

(22) Filed: Dec. 2, 2009

(65) Prior Publication Data

US 2011/0085060 A1 Apr. 14, 2011

(30) Foreign Application Priority Data

Oct. 8, 2009 (CN) .......................... 2009 1 0308084

(51) Int. Cl.
 *H04N 5/225* (2006.01)
(52) U.S. Cl. .............. 348/218.1; 348/222.1; 348/333.01
(58) Field of Classification Search ............... 348/218.1, 348/222.1, 333.01, 333.02
See application file for complete search history.

(56) References Cited

U.S. PATENT DOCUMENTS

| 6,552,744 B2 * | 4/2003 | Chen ........................... 348/218.1 |
| 7,423,671 B2 * | 9/2008 | Kiso ............................. 348/218.1 |
| 2004/0165075 A1 * | 8/2004 | Okada et al. ............. 348/207.99 |
| 2009/0185056 A1 * | 7/2009 | Okamoto et al. ........ 348/240.99 |

* cited by examiner

*Primary Examiner* — Gevell Selby
(74) *Attorney, Agent, or Firm* — Altis Law Group, Inc.

(57) ABSTRACT

A method for combining images in a camera device, includes following steps. The camera device takes a first image. A first inclination angle of the camera device at the time of taking the first image is saved. A view finder of the camera device finds a next view, and compares the current inclination angle of the camera device with the first inclination angle. If the angles are not the same, the view finder inclines to adjust the current inclination angle of the camera device until the angles are the same. The camera device takes a second image. The first image and the second image are combined to generate a new image.

10 Claims, 5 Drawing Sheets

METHOD AND SYSTEM FOR COMBINING IMAGES IN CAMERA DEVICE

BACKGROUND

1. Technical Field

The present disclosure relates to methods and systems for processing images, and particularly to a method and system for combining images.

2. Description of Related Art

When using digital camera taking images, wide angle lens are often needed to shoot wide angle scenes. However, normal cameras often do not equip with wide angle lens which limits the normal camera's ability to shoot wide angle scenes. Even if some advanced cameras are equipped with wide angle lens, it is not convenient to carry the wide angle lens. Furthermore, the wide angle lens are precision components and difficult to maintain.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
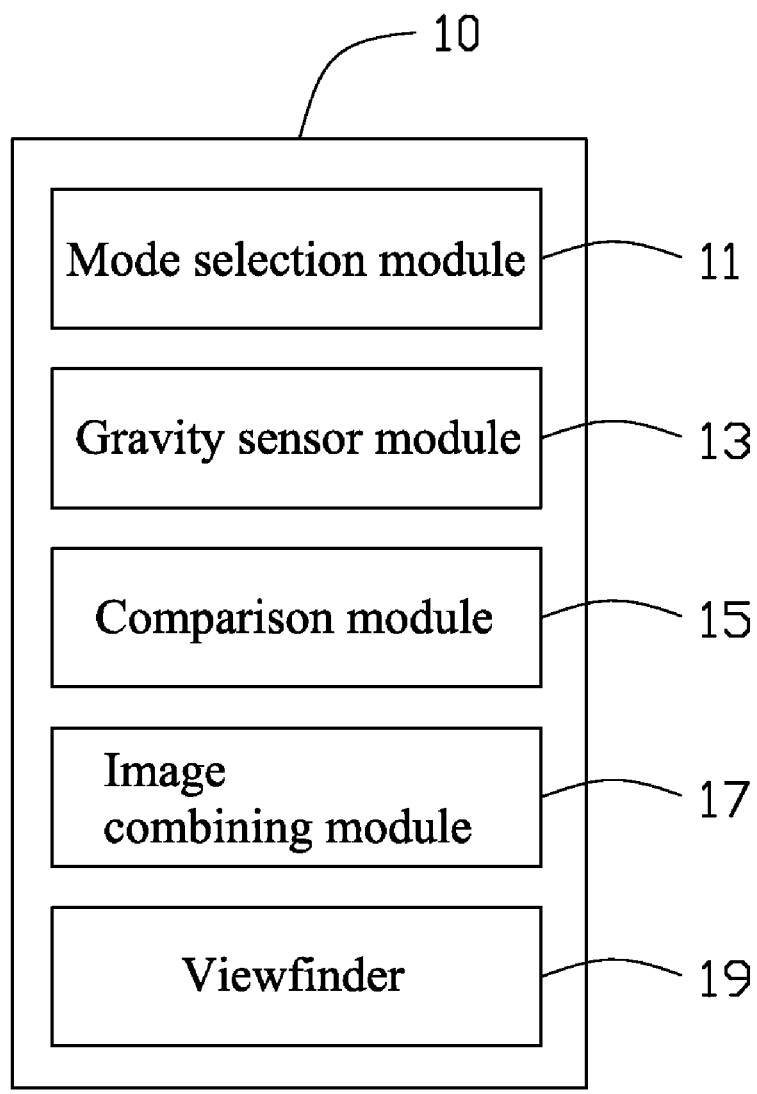
FIG. 1 is a block view of an embodiment of a system for combining images.

Referring to FIG. 1, a system for processing images includes a camera device 10. The camera device 10 includes a mode selection module 11, a gravity sensor module 13, a comparison module 15, an image combing module 17, and a viewfinder 19.

The mode selection module 11 defines a plurality of image capturing work modes of the camera device 10, which includes different image combining modes. When the camera device 10 works in a combining mode, the camera 10 can capture several images in succession and combine them into a wide angle image such as would normally be captured using a wide-angle lens. The mode selection module 11 defines different combining modes according to the number of images the user desires to combine, such as a two image mode, a four image mode, and so on.

Figures 2A, 2B, 2C:
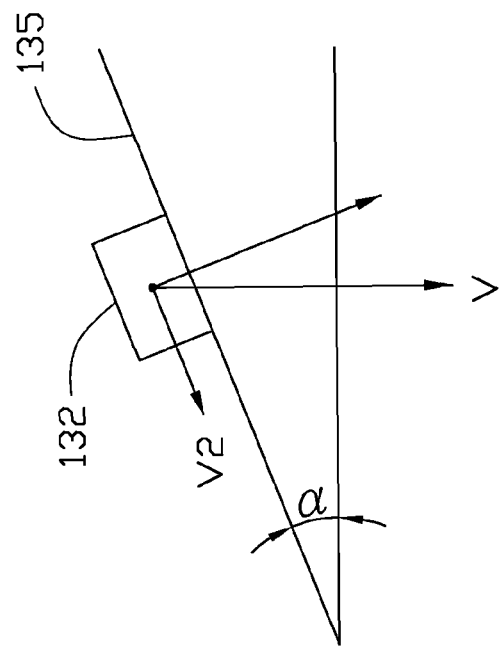
FIG. 2 is a sketch view of a gravity sensor module according to one embodiment.

Referring to FIGS. 1 and 2, the gravity sensor module 13 is capable of sensing an inclination angle of the camera device 10. The gravity sensor module 13 is positioned in the camera device 10 for converting inclination angle changes to voltage signals. When the camera device 10 is deviated from the true horizontal orientation, parallel to the ground, the gravity sensor module 13 outputs a corresponding voltage signal, different from that of when the camera device 10 is properly horizontally orientated, which represents inclination angle of the camera device.

The gravity sensor module 13 includes a mass block 132 and a voltage output pressure transmitter 135 supporting and attaching the mass block 132 thereon. When the pressure transmitter 135 is in a horizontal position and the mass block 132 is stationary on the pressure transmitter 135, the pressure transmitter 135 outputs a corresponding voltage V1. When the pressure transmitter 135 and the mass block 132 are vertically located, the pressure transmitter 135 outputs a corresponding voltage V2. When the pressure transmitter 135 inclines at an angle A1 and the mass block 132 is located on the pressure transmitter 135, the pressure transmitter 135 outputs a corresponding voltage V. Therefore, a relation between the angle A1 and voltage V is: $A1=\arccos[V/(V1-V2)]$. Inclination angle of the camera device 10 can be calculated according to output voltage of the pressure transmitter 135.

Referring to FIG. 1, the comparison module 15 is capable of comparing an image with a view of the viewfinder 19 of the camera device 10.

The image combining module 17 is capable of combining images in the camera device 10 and overlapping the same parts of different images.

Figure 3A:
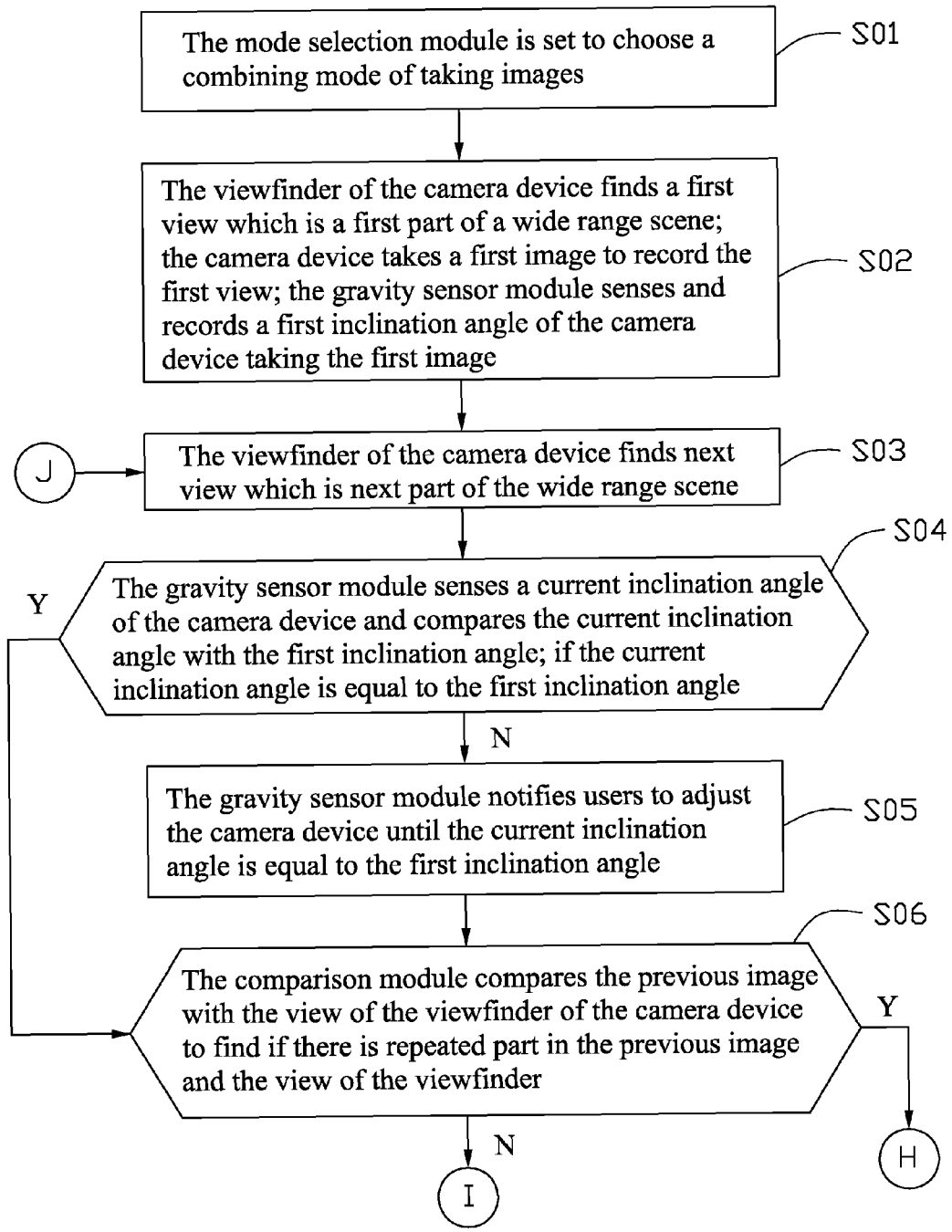
FIG. 3 is a flow chart of an embodiment of a system of combining images.
Figure 3B:
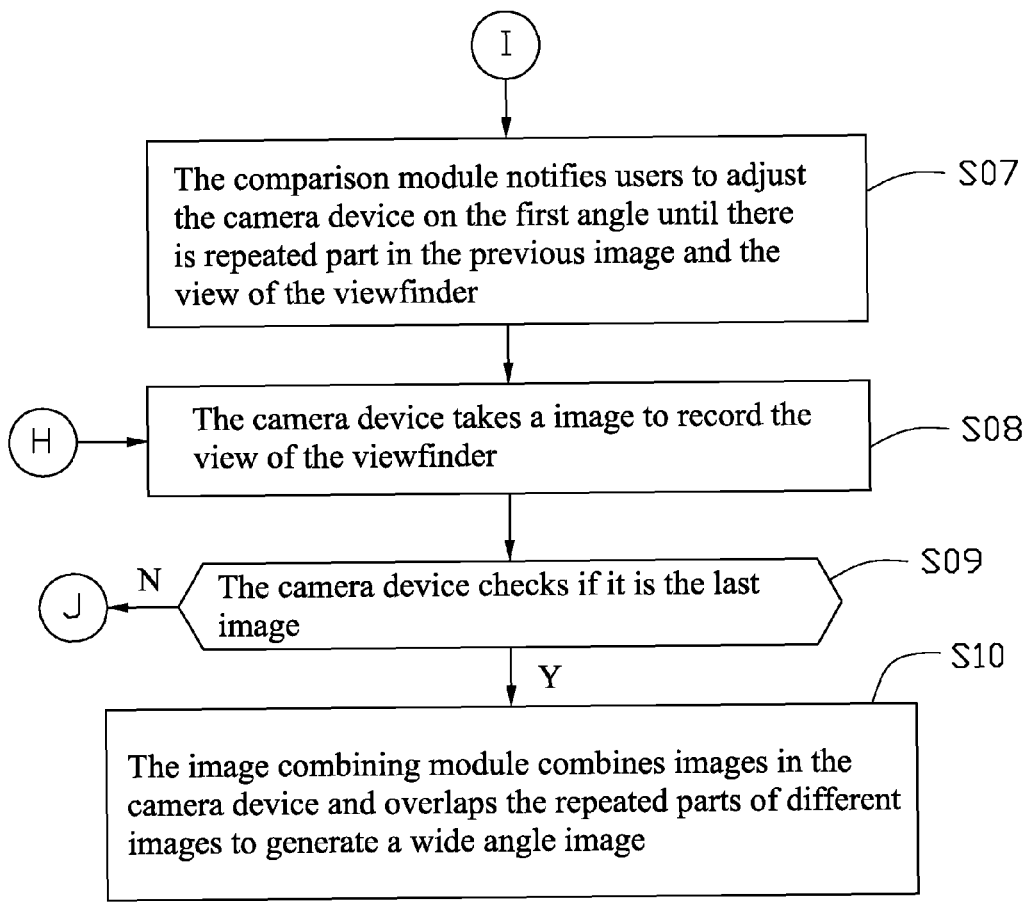

FIG. 3 is a flow chart illustrating a method for combining images in the camera device 10. Depending on the embodiment, certain steps described below may be removed, while others may be added, and the sequence of the steps may be altered. In one embodiment, the method for combining images in the camera device 10 includes the following steps:

S01, a user sets the mode selection module 11 to choose a combining mode of taking images. Then, go to step S02.

S02, the viewfinder 19 of the camera device 10 finds a first view which is a first part of a wide scene as determined by the user. The camera device 10 takes a first image to record the first view. The gravity sensor module 13 senses and records a first inclination angle of the camera device 10 taking the first image.

S03, the viewfinder 19 of the camera device 10 finds next view which is next part of the wide range scene.

S04, the gravity sensor module 13 senses a current inclination angle of the camera device 10 and compares the current inclination angle with the first inclination angle. If the current inclination angle is not equal to the first inclination angle, go to step S05; if equal, go to step S06.

S05, the gravity sensor module 13 notifies users to adjust the camera device 10 until the current inclination angle is equal to the first inclination angle.

S06, the comparison module 15 compares the previous image with the view of the viewfinder 19 of the camera device 10 to find if there is repeated part in the previous image and the view of the viewfinder 19. If there is not, go to step S07; if there is, go to S08.

S07, the comparison module 15 notifies users to adjust the camera device 10 on the first angle until there is repeated part in the previous image and the view of the viewfinder 19.

S08, the camera device 10 takes a image to record the view of the viewfinder 19.

S09, the camera device 10 checks if it is the last image. For example, if the mode module 11 chooses a four image mode in step S01, check if it is the fourth image. If it is the last image, go to step S10; if it is not, go to step S03.

S10, the image combining module 17 combines images in the camera device 10 and overlaps the repeated parts of different images to generate a wide angle image.

Figure 4:
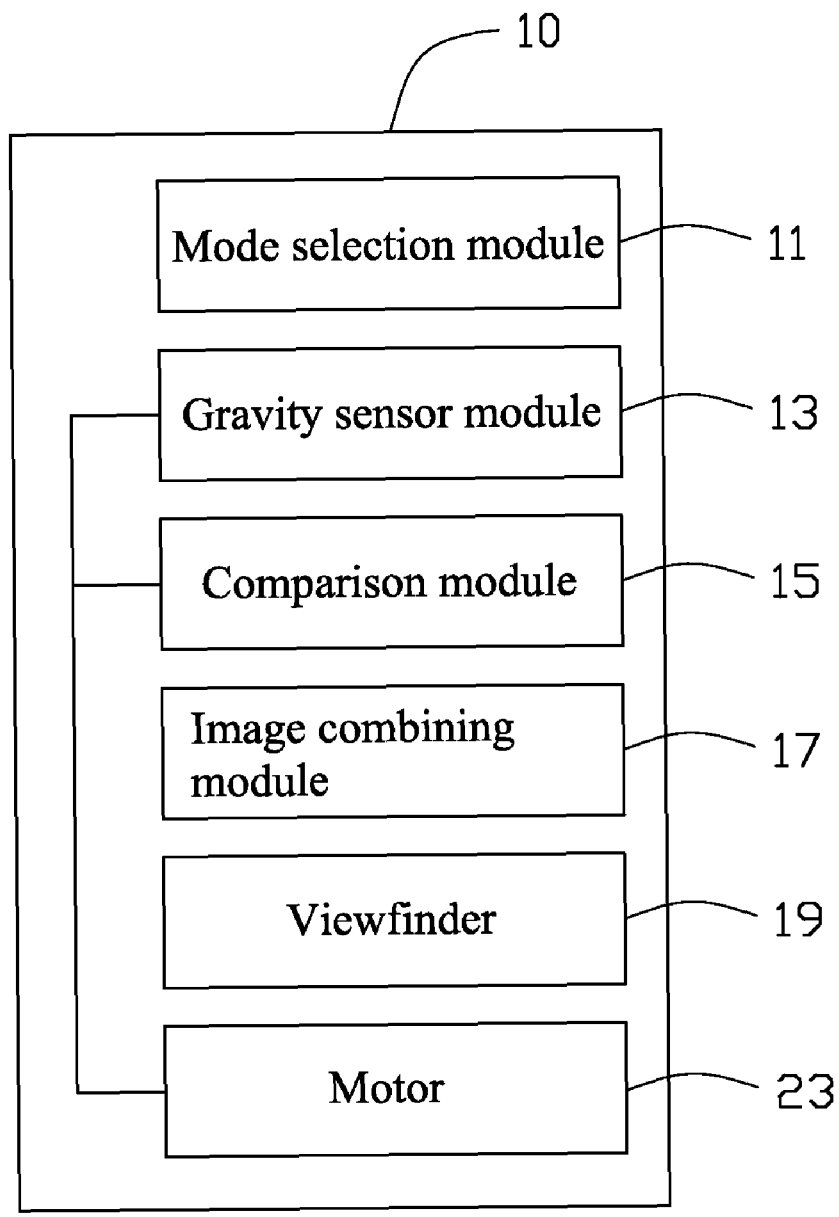
FIG. 4 is a block view of another embodiment of a system for combining images.

Referring to FIG. 4, a motor 23 can be mounted in the camera device 10 and connected to the gravity sensor module 13 and the comparison module 15. The motor 23 is capable of rotating to automatically adjust an angle and position of the camera device 10. The gravity sensor module 13 controls the motor 23 rotating to have the camera device 10 located in a same inclination angle when take different images, or in a predetermined angle. The comparison module 15 controls the motor 23 rotating to have the view of viewfinder 19 and the previous image having repeated parts. Therefore, the camera device 10 is capable of automatically capturing image when the inclination is right and repeated parts are found.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for combining images in a camera device, the method comprising the following steps:

taking a first image by the camera device;

determining a first inclination angle of the camera device according to an output voltage of a voltage output pressure transmitter of a gravity sensor module;

sensing and saving the first inclination angle of the camera device at the time of taking the first image;

finding a next view by a viewfinder of the camera device, and comparing a current inclination angle of the camera device with the first inclination angle; if the current angle and the first inclination angle are not the same, adjusting the current inclination angle by sending a first signal until the current inclination angle is equal to the first inclination angle;

capturing a second image; and generating a new image by combining the first image and the second image.

2. The method of claim 1, wherein before the step of capturing the second image, checking if there is a repeated part in the first image and in the view of the viewfinder; if there is no repeated part, adjusting the viewfinder by sending a second signal until there is a repeated part in the first image and the next view of the viewfinder.

3. The method of claim 2, wherein the step of generating a new image by combining the first image and the second image further comprises overlapping a repeated part of the first image and second images.

4. The method of claim 1, further comprising outputting a first voltage by the voltage output pressure transmitter when the voltage output pressure transmitter is in a horizontal position and a mass block is stationary located on the pressure transmitter; outputting a second voltage by the voltage output pressure transmitter when the voltage output pressure transmitter and the mass block are vertically located; outputting a third voltage by the voltage output pressure transmitter when the pressure transmitter inclines at first angle and the mass block is located on the pressure transmitter; and calculating the first angle based on the first voltage, the second voltage, and the third voltage.

5. A system for combining images comprising:

a camera device capable of taking images, the camera device comprising:

a viewfinder capable of finding views;

a gravity sensor module capable of sensing an inclination angle of the camera device;

a comparing module capable of comparing a view of the viewfinder with a image taken by the camera and checking whether there is repeated part in the view and the image; and a image combining module capable of combining two images and overlapping repeated parts of the two images to generate a new image;

wherein the gravity sensor module comprises a mass block and a voltage output pressure transmitter supporting the mass block thereon, the inclination angle of the camera device is determined according to an output voltage of the voltage output pressure transmitter.

6. The system of claim 5, wherein the camera device further comprises a mode selection module which defines a plurality of work modes, the plurality of work modes comprises different combine modes according to number of images to be combined.

7. The system of claim 5, wherein when the voltage output pressure transmitter is in a horizontal position and the mass block is stationary located on the voltage output pressure transmitter, the pressure transmitter outputs a corresponding voltage V1; when the voltage output pressure transmitter and the mass block are vertical, the voltage output pressure transmitter outputs a corresponding voltage V2; when the voltage output pressure transmitter inclines an angle A1 and the mass block is located on the voltage output pressure transmitter, the voltage output pressure transmitter outputs a corresponding voltage V, and a relation between the angle A1 and voltage V is : $A1=\arccos[V/(V1-V2)]$.

8. The system of claim 5, wherein the camera device further comprises a motor connected to the gravity sensor module and the comparison module; the gravity sensor module is capable of causing the motor to rotate the camera device to the inclination angle; the comparison module is capable causing the motor to rotating the camera device so that the view of viewfinder and the previous image have repeated parts.

9. A method for combining images in a camera device, the method comprising the following steps:

providing a camera device, a viewfinder, a gravity sensor module sensing an inclination angle of the camera device, a comparing module comparing a view of the viewfinder with an image taken by the camera and checking whether there are repeated parts in the view and the image, a image combining module combining images and overlapping repeated parts of the images to generate a new image, and a motor rotating to automatically adjust an angle and a position of the camera device, wherein the gravity sensor module comprises a mass block and a voltage output pressure transmitter supporting the mass block thereon;

determining the inclination angle of the camera device according to an output voltage of the voltage output pressure transmitter of the gravity sensor module;

taking a first image by the camera device and saving a first inclination angle of the camera device at the time of taking the first image;

finding a next view by the viewfinder, and comparing a current inclination angle of the camera device with the first inclination angle; if the current inclination angle and the first inclination angle are not the same, sending a signal to driving the motor to adjust the current inclination angle of the camera device until the current inclination angle and the first inclination angle are the same;

checking if there is a repeated part in the first image and the next view of the viewfinder by the comparing module; if there is no repeated part, sending a signal to drive the motor to adjust the camera device until there is a repeated part in the first image and the next view of the viewfinder;

taking a second image; and combining the first image and the second image and overlapping the repeated parts of the first image and the second image to generate a new image by the image combining module.

10. The method of claim 9, further comprising outputting a first voltage by the voltage output pressure transmitter when the voltage output pressure transmitter is in a horizontal position and the mass block is stationary on the pressure transmitter; outputting a second voltage by the voltage output pressure transmitter when the voltage output pressure transmitter and the mass block are vertically located; outputting a third voltage by the voltage output pressure transmitter when the pressure transmitter inclines at first angle and the mass block is located on the pressure transmitter; and calculating the first angle based on the first voltage, the second voltage, and the third voltage.

* * * * *